Patented May 16, 1933

1,909,329

UNITED STATES PATENT OFFICE

GAIL R. YOHE, OF AKRON, OHIO, ASSIGNOR TO THE GOODYEAR TIRE & RUBBER COMPANY, OF AKRON, OHIO, A CORPORATION OF OHIO

AGE RESISTER

No Drawing.    Application filed May 29, 1930. Serial No. 457,543.

This invention relates to improvements in rubber compounds and it has particular relation to the provision of compounds which offer exceptional resistance to the attacks of air, light, heat and other weathering agencies which normally produce premature decay and loss of tensile strength and elasticity of rubber materials.

The object of the invention is to provide a method of treating rubber or rubber-like materials which is relatively economical to use and which results in a product of exceptionally high quality and uniformity.

Heretofore, it has been observed that certain organic materials such as hydroquinone, diphenyl amine and reaction products of certain aldehydes with amines, e. g. the reaction product of acetaldol and alpha naphthylamine when incorporated into rubber resulted in the formation of materials of substantially greater durability than corresponding materials containing no preservative. These age retarding materials have been designated as antioxidants or age retarders.

This invention consists in the discovery that ketonic bodies; i. e., materials of the structure represented by the formula

in which R and $R_1$ are hydrocarbon radicals, when reacted with amines and incorporated into rubber also have the power of retarding the action of weathering agencies in that material.

As a specific example of such material, the reaction product of acetone and aniline is mentioned, which may be prepared by bringing those two materials together in the presence of an excess of hydrochloric acid and heating the mixture. Details for the preparation of the compound are contained in the 14th volume of Friedlander, page 721. The material obtained may be purified by subjecting it to distillation at a temperature ranging from 235° to 250° C. under a pressure of four millimeters of mercury.

A similar material which also posseses antioxidant properties may be prepared by reacting two mols of aniline with one mol of cyclo hexanone

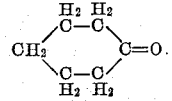

The typical reaction and resultant product formed thereby for these classes of materials may be represented by the equation:

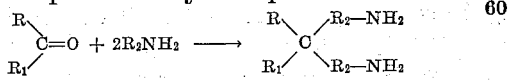

in which R and $R_1$ represent any hydrocarbon radicals and $R_2$ represents a benzene group. It is, of course, to be understood that the grouping or structure represented in the final or resultant material is responsible for the antioxidant properties of the reaction products. Accordingly, any material possessing such structure will exhibit this characteristic property although it may be formed by methods other than by the reaction of ketones with aryl amines. However, at the present time, the described method of preparation apparently is the most practicable from a commercial viewpoint.

It is also to be understood that since the grouping

where $R_1$ and $R_2$ are aryl) consisting of two aryl amine radicals attached to the same carbon atom apparently is the portion of the molecule essential to the antioxidant properties of this class of materials, the substitution of other ketones than acetone or cyclo hexanone does not destroy the valuable characteristics of the resultant materials. For example, it is quite feasible to substitute diethyl ketone, ethyl methyl ketone or any similar material for the ketones described. Any of these ketones may also be reacted with other amines than the aniline. Specific examples of such materials are xylidine, toluidine and amino hydroxy substituted benzenes such, for example, as amino phenol. However, these latter types of materials are more expensive to obtain than the materials described in detail above and accordingly, they are at present less desirable than the materials first described.

Although these antioxidants may be incorporated into substantially any of the standard rubber formulæ with good results, the following are typical examples of such formulæ which have been found by actual tests, to yield products of highly satisfactory quality.

(a)

| | | |
|---|---|---|
| Acetone extracted pale crepe rubber | 100 | parts |
| Zinc oxide | 5 | parts |
| Sulfur | 3 | parts |
| Hexamethylene tetramine | 1 | part |
| Stearic acid | 1.5 | parts |
| Antioxidant | 1 | part |

(b)

| | | |
|---|---|---|
| Smoked sheet rubber | 100 | parts |
| Zinc oxide | 92.5 | parts |
| Carbon black | .6 | parts |
| Ferric oxide | .7 | parts |
| Sulfur | 3.5 | parts |
| Diphenylguanidine | .7 | parts |
| Antioxidant | 5 | parts |

Two sets of samples were prepared from each of these types of stock, one set of samples being subjected to vulcanization and physical tests to ascertain the tensile strength and elasticity thereof prior to aging.

The second set of samples prepared in accordance with Formula (a) was then placed in an oxygen bomb and heated to a temperature of 50° C. while subjected to a pressure of 150 pounds per square inch during a period of six days. The second set of samples (b) prepared in accordance with the second formula were subjected to relatively more severe treatment in a bomb charged with air at a pressure of 80 pounds per square inch and at a temperature of 114° C. for a period of seven hours. These accelerated aging treatments are equivalent to several years of exposure under normal conditions of temperature and pressure. The results of these various tests are tabulated as follows:

Low temperature test

| Cure | | Stress in kgs/cm² at | | | Elong. at break | Percent weight increase |
|---|---|---|---|---|---|---|
| Time in mins. | Temp. °F | 500% elong. | 700% elong. | Break | | |

1,1-di (p-amino phenyl) cyclohexane
Original

| 35 | 285 | 26 | 96 | 164 | 800 | |
| 50 | 285 | 37 | 146 | 174 | 735 | |
| 70 | 285 | 52 | 204 | 210 | 705 | |

Aged in oxygen bomb 6 days at 50° C.

| 35 | 285 | 33 | 124 | 148 | 705 | .04 |
| 50 | 285 | 43 | ----- | 157 | 695 | .44 |
| 70 | 285 | 63 | ----- | 180 | 655 | .73 |

| Cure | | Stress in kgs/cm² at | | | Elong. at break | Percent weight increase |
|---|---|---|---|---|---|---|
| Time in mins. | Temp. °F | 500% elong. | 700% elong. | Break | | |

High temperature test
Original

| | | 300% | 500% | | | |
| 35 | 285 | 29 | 84 | 172 | 615 | |
| 50 | 285 | 36 | 102 | 186 | 640 | |
| 70 | 285 | 44 | 120 | 208 | 625 | |

Aged in air bomb 7 hours at 114° C.

| 35 | 285 | 47 | 110 | 114 | 510 | |
| 50 | 285 | 58 | ----- | 116 | 580 | |
| 70 | 285 | 68 | ----- | 93 | 370 | |

2,2-di (p-amino phenyl) propane
Low temperature test
Original

| | | 500% | 700% | | | |
| 35 | 285 | 23 | 88 | 126 | 765 | |
| 50 | 285 | 34 | 135 | 146 | 710 | |
| 70 | 285 | 53 | ----- | 176 | 675 | |

Aged in oxygen bomb 6 days at 50° C.

| 35 | 285 | 32 | 125 | 160 | 745 | .12 |
| 50 | 285 | 43 | 168 | 176 | 710 | .19 |
| 70 | 285 | 66 | ----- | 190 | 655 | .21 |

High temperature test
Original

| | | 300% | 500% | | | |
| 35 | 285 | 30 | 91 | 186 | 675 | |
| 50 | 285 | 36 | 106 | 210 | 660 | |
| 70 | 285 | 43 | 121 | 214 | 635 | |

Aged in air bomb 7 hours at 114° C.

| 35 | 285 | 45 | 110 | 128 | 540 | |
| 50 | 285 | 55 | 127 | 148 | 540 | |
| 70 | 285 | 63 | 144 | 152 | 515 | |

From the data appearing in the tables, it is evident that the samples containing the ketone-amine reaction products resist oxidation and resultant deterioration to a remarkable degree even under the relatively severe conditions existing in the oxygen bomb. In fact, in the case of the reaction product of acetone and aniline, the material prepared in accordance with formula (a) was found to possess materially higher tensile strength after being subjected to artificial aging than the original compound. At the same time, the elasticity or ability of the material to withstand elongation without breaking was but slightly impaired. Under similar conditions, rubber stocks of identical compositions except for the omission of the antioxidant would have been reduced to resinous masses substantially devoid of tensile strength and elasticity. The new antioxidants may readily be prepared from readily available materials which may be obtained at comparatively slight cost. The reactions necessary for their preparation and purification are also quite simple and easy of execution.

The materials are not appreciably toxic under the conditions in which they are normally used in the factory and for that reason, they do not require any particular precautions in their handling. The materials also blend readily with rubber to produce compounds of high uniformity. These properties of the new antioxidants render them particularly desirable from the standpoint of commercial use.

Although I have described but the preferred forms of the invention, it will be apparent to those skilled in the art that the invention is not so limited but that various modifications may be made therein without departing from the spirit of the invention or from the scope of the appended claims.

What I claim is:

1. A method of preserving rubber which comprises subjecting it to vulcanization in the presence of the reaction product of an amino phenol and acetone.

2. A method of preserving rubber which comprises subjecting it to vulcanization in the presence of the reaction product of an amino phenol and cyclohexanone.

3. A method of preserving rubber which comprises subjecting it to vulcanization in the presence of a material having the formula

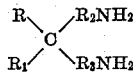

in which R and $R_1$ are hydrocarbon groups and $R_2$ and $R_3$ are phenol groups.

4. A rubber product that has been vulcanized in the presence of a reaction product of an amino phenol and a ketone selected from a group comprising acetone, cyclohexanone, ethyl methyl ketone and diethyl ketone.

5. A rubber product that has been vulcanized in the presence of a material having the formula

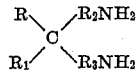

in which R and $R_1$ are aliphatic hydrocarbon groups and $R_2$ and $R_3$ are hydroxy-substituted benzene groups.

6. A rubber product that has been vulcanized in the presence of a material having the formula

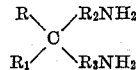

in which R and $R_1$ are aliphatic hydrocarbon groups and $R_2$ and $R_3$ are phenol groups.

7. A method of preserving rubber which comprises vulcanizing in the presence of the reaction product of an amino hydroxy benzene and acetone.

8. A method of preserving rubber which comprises vulcanizing in the presence of the reaction product of an amino hydroxy benzene and cyclohexanone.

9. A method of preserving rubber which comprises vulcanizing in the presence of the reaction product of an amino hydroxy benzene and diethyl ketone.

10. A method of preserving rubber which comprises vulcanizing in the presence of a dialkyl di (amino phenol) methane.

11. A rubber product that has been vulcanized in the presence of a dimethyl di (amino phenol) methane.

12. A rubber product that has been vulcanized in the presence of a dialkyl di (amino hydroxy benzene) methane.

In witness whereof, I have hereunto signed my name.

Signed at Akron, in the county of Summit and State of Ohio, U. S. A., this 28 day of May, 1930.

GAIL R. YOHE.